United States Patent
Schnitzer et al.

(10) Patent No.: US 12,465,186 B2
(45) Date of Patent: Nov. 11, 2025

(54) METHOD FOR OPERATING A MOBILE SELF-PROPELLED APPLIANCE AND MOBILE SELF-PROPELLED APPLIANCE OPERATED ACCORDING TO THE METHOD

(71) Applicant: BSH Hausgeräte GmbH, Munich (DE)

(72) Inventors: Frank Schnitzer, Bad Neustadt (DE); Kristina Daniel, Bad Neustadt (DE); Stefan Hassfurter, Maroldsweisach (DE)

(73) Assignee: BSH Hausgeräte GmbH, Munich (DE)

( * ) Notice: Subject to any disclaimer, the term of this patent is extended or adjusted under 35 U.S.C. 154(b) by 47 days.

(21) Appl. No.: 18/494,830

(22) Filed: Oct. 26, 2023

(65) Prior Publication Data

US 2024/0148210 A1 May 9, 2024

(30) Foreign Application Priority Data

Nov. 4, 2022 (DE) .................. 10 2022 211 684.4

(51) Int. Cl.
*A47L 11/40* (2006.01)
*A47L 9/28* (2006.01)
*G05D 1/00* (2006.01)

(52) U.S. Cl.
CPC ......... *A47L 11/4011* (2013.01); *A47L 9/2805* (2013.01); *A47L 9/2852* (2013.01); *G05D 1/0219* (2013.01); *A47L 2201/04* (2013.01)

(58) Field of Classification Search
CPC .. A47L 11/4011; A47L 9/2805; A47L 9/2852; A47L 2201/04; G05D 1/0219
See application file for complete search history.

(56) References Cited

U.S. PATENT DOCUMENTS

| | | | |
|---|---|---|---|
| 7,673,367 B2 | 3/2010 | Kim et al. | |
| 9,844,876 B2 | 12/2017 | Chung et al. | |
| 2021/0361136 A1* | 11/2021 | Kim | ...................... G05D 1/0212 |
| 2022/0276654 A1* | 9/2022 | Lee | ...................... G05D 1/0214 |
| 2023/0200611 A1 | 6/2023 | Kim et al. | |
| 2024/0148210 A1* | 5/2024 | Schnitzer | ............... A47L 9/2852 |

FOREIGN PATENT DOCUMENTS

| | | |
|---|---|---|
| CN | 101923351 B | 3/2015 |
| CN | 106974593 A | 7/2017 |
| CN | 111513626 A | 8/2020 |
| DE | 102007060750 A1 | 6/2009 |

(Continued)

OTHER PUBLICATIONS

Machine Translation of TW I691297B (Year: 2021).*

*Primary Examiner* — Sharidan Carrillo
(74) *Attorney, Agent, or Firm* — Laurence A. Greenberg; Werner H. Stemer; Ralph E. Locher

(57) ABSTRACT

A method for operating a mobile self-propelled appliance, in particular a floor cleaning appliance such as a robot vacuum cleaner and/or robot sweeper and/or robot mopping appliance, includes detecting at least one obstacle in a floor processing area, cleaning a surrounding area of the obstacle by using at least two straight driving maneuvers at the obstacle from different directions, and basing the number and direction of the straight driving maneuvers on a size and/or shape of the obstacle. A mobile self-propelled appliance which is configured to implement the method is also provided.

6 Claims, 3 Drawing Sheets

(56) References Cited

FOREIGN PATENT DOCUMENTS

| | | | |
|---|---|---|---|
| DE | 102012112036 | A1 | 6/2014 |
| EP | 1935308 | B1 | 5/2011 |
| KR | 1020220056643 | A | 5/2022 |
| WO | 2018196203 | A1 | 11/2018 |
| WO | 2018196204 | A1 | 11/2018 |

* cited by examiner

METHOD FOR OPERATING A MOBILE SELF-PROPELLED APPLIANCE AND MOBILE SELF-PROPELLED APPLIANCE OPERATED ACCORDING TO THE METHOD

CROSS-REFERENCE TO RELATED APPLICATION

This application claims the priority, under 35 U.S.C. § 119, of German Patent Application DE 10 2022 211 684.4, filed Nov. 4, 2022; the prior application is herewith incorporated by reference in its entirety.

FIELD AND BACKGROUND OF THE INVENTION

The invention relates to a method for operating a mobile self-propelled appliance, in particular a floor cleaning appliance, such as a robot vacuum cleaner and/or robot sweeper, which is provided, inter alia, for cleaning a surrounding area of obstacles, and also to a mobile self-propelled appliance which is operated according to such a method.

Mobile self-propelled appliances such as for example robot vacuum cleaners have the task of cleaning an entire floor surface as autonomously as possible. In particular, robot vacuum cleaners are to relieve their users of the task of regularly removing dust and dirt from the floor. In this case, areas close to the wall as well as areas around smaller obstacles, such as chair and table legs, are to be cleaned as completely and as close to the obstacle as possible.

Often, robot vacuum cleaners have a side brush for cleaning. This should enable the robot vacuum cleaner to clean up to walls and in corners, since a suction mouth of the robot usually does not reach up to an edge of the robot housing. Especially in the case of round robot vacuum cleaners, the side brush is used to compensate for the relatively small suction mouth. For cleaning along straight wall sections, a side brush is well suited for cleaning. When driving around smaller obstacles or objects, however, the side brushes can disadvantageously leave an uncleaned area or edge due to their positioning.

In some cases, robot vacuum cleaners have a base body that includes a D-shape. D-shaped robots, which are additionally equipped with a side brush, can generally clean particularly well along walls and in corners. In the case of D-shaped robots, the side brush can be placed further to the edge based on the front corners in the contour of the robot, which can advantageously improve the cleaning of straight wall sections. When driving around smaller obstacles, however, larger uncleaned areas appear than with round robots.

For improved edge and corner cleaning, it is known to equip robot vacuum cleaners with an additional, separate suction channel. While it is possible to bring a high suction power into a room corner due to the connection to the fan that can be switched over by using a valve, uncleaned areas are hardly reduced as a result when circling a smaller obstacle.

European Patent EP 1 935 308 B1, corresponding to U.S. Pat. No. 7,673,367, and German Application DE 10 2007 060 750 A1, describe pivotable brushes, which are intended for edge cleaning along walls and in corners, and can also enable cleaning near to an obstacle during a corresponding driving maneuver. However, the configuration of a unit that can swivel or fold out entails increased mechanical complexity. In addition, the necessary, driving maneuvers that are no less complex can significantly increase the overall cleaning time.

International Publication WO 2018 196 203 A1 and International Publication WO 2018 196 204 A1 describe special cleaning assemblies for chair legs. Those special cleaning assemblies encircle the leg and clean all around it and almost to the edge. That concept can also be applied to other small objects, but the implementation is associated with an increased mechanical complexity and is only suitable for objects with a specific diameter or a certain size and shape.

SUMMARY OF THE INVENTION

It is accordingly an object of the invention to provide a method for operating a mobile self-propelled appliance and a mobile self-propelled appliance operated according to the method, which overcome the hereinafore-mentioned disadvantages of the heretofore-known appliances and methods of this general type and in which surrounding areas that are around, in particular, small obstacles and/or objects, can be cleaned as close to the edge as possible by using straight driving maneuvers.

With the foregoing and other objects in view there is provided, in accordance with the invention, a method for operating a mobile self-propelled appliance, in particular a floor cleaning appliance such as a robot vacuum cleaner and/or robot sweeper and/or robot mopping appliance, comprising the following method steps:
  detecting at least one obstacle in a floor processing area,
  cleaning a surrounding area of the obstacle by performing at least two straight driving maneuvers at the obstacle from different directions,
  wherein the number and direction of the straight driving maneuvers are based on a size and/or shape of the obstacle.

Advantageous embodiments and developments are the subject matter of the subclaims.

In accordance with the invention, a method for reducing inaccessible areas around, in particular, small obstacles is therefore provided, in which an optimization of the driving strategy of the appliance forms the basis. By suitably planning the travel paths of the appliance, it is advantageously possible to omit complex mechanical assemblies. The method can advantageously be implemented irrespective of the shape and orientation of the obstacles or objects.

In accordance with the invention, obstacles are cleaned up to the edge due to straight driving maneuvers along or past the obstacle. How often the appliance travels along the obstacle from different directions is determined inter alia from the size and shape of the obstacle.

The appliance that is provided for this operating method preferably has a cleaning element which projects laterally beyond the contour of the appliance. This can be, for example, a rotating side brush, fixed bristle strips or a cleaning cloth. The appliance housing can be D-shaped or round, for example. With its drives and its control unit, the appliance is preferably able to travel straight paths in any direction on the floor.

A mobile self-propelled appliance is to be understood in particular as a floor cleaning appliance which, for example, autonomously processes floor surfaces in the household area. These include, inter alia, robot vacuum cleaners and/or robot sweepers and/or robot mopping machines such as, for example, robot vacuum cleaners. During operation (cleaning operation), these appliances work preferably without or with as little user intervention as possible. For example, the appliance automatically travels into a predetermined room in order to clean the floor in accordance with a predetermined and programmed method strategy.

In order to be able to take into account any individual environmental characteristics, an exploration journey with the mobile self-propelled appliance preferably takes place. An exploration journey is to be understood in particular as an investigatory journey which is suitable for investigating a floor surface to be processed for obstacles, floor plan and the like. The aim of an exploration journey is, in particular, to be able to assess and/or represent the conditions of the floor processing area that is to be processed.

After the exploration journey, the mobile self-propelled appliance knows its environment and can pass it on to the user in the form of an environment map, for example in an app (cleaning app) on a mobile device. In the environment map, the user can be given the opportunity to interact with the mobile self-propelled appliance. The user can advantageously view information in the environment map and change and/or adapt the information if necessary.

An environment map is to be understood in particular as any map which is suitable for representing the environment of the floor processing area with all its obstacles and objects. For example, the environment map shows the floor processing area having the furniture and walls contained therein in the manner of an outline.

The environment map with the obstacles is preferably displayed in the app on a portable additional device. This is used in particular to visualize a possible interaction for the user. In the present case, an additional device is to be understood in particular as any device which is portable for a user, which is disposed outside the mobile self-propelled appliance, in particular externally and/or differentiated from the mobile self-propelled appliance, and is suitable for displaying, providing, communicating and/or transmitting data, such as, for example, a mobile phone, a smartphone, a tablet and/or a computer or laptop.

The app, in particular a cleaning app, is installed on the portable additional device, which is used for the communication of the mobile self-propelled appliance with the additional device and in particular renders possible a visualization of the floor processing area, in other words the living room to be cleaned or the apartment or living area to be cleaned. The app preferably shows the user the area to be cleaned as an environment map.

Process steps are to be understood in particular as steps which can be performed one after the other and which influence the driving behavior of the appliance. The steps can be performed directly one after the other or can include intermediate steps.

Obstacles are to be understood in particular as any objects located in the floor processing area, such as for example furniture, appliances, clothing, toys, pet products, and the like. The obstacles are detected by the appliance, for example, by using at least one sensor, preferably a lidar sensor and/or a collision sensor, for example a bumper.

A surrounding region of an obstacle is to be understood in particular as the region which encircles or directly surrounds the obstacle, and in particular adjoins the obstacle. The surrounding area extends in particular completely around the obstacle, for example in a 360° radius.

A straight driving maneuver is to be understood in particular as a curve-free driving behavior of the appliance, which in particular moves along a straight path. Rotations, cornering, reversing, or driving on a circular path are substantially not included.

Different directions are to be understood in particular as journeys of the appliance along the obstacle from different spatial or floor area directions. The journeys of the appliance preferably do not run parallel to one another but rather have an intersect at least in their extension. Similarly, journeys of the appliance in the opposite direction are to be understood as journeys from different directions.

A size of the obstacle is to be understood in particular as its size in cross-section, in other words in section through the obstacle in a plane that extends parallel to the floor. A height of the obstacle is in particular not taken into account in this case. A shape of the obstacle is to be understood in particular as its contour in the plane of extension parallel to the floor. In order to determine the number of driving maneuvers required, the size and shape of the obstacle that is to be driven around are detected by the sensor of the appliance. Depending on the detected dimensions, the minimum number of straight driving maneuvers is then calculated by the appliance.

In an advantageous embodiment, the number of straight driving maneuvers is further based on an operating range of cleaning elements of the appliance and/or on a predetermined minimum distance between the appliance and the obstacle. The necessary number of passes is thus determined from the operating range of the cleaning element, for example the side brush, a predefined minimum distance between appliance and obstacle during the pass, and the shape and size of the obstacle. The cleaning journey around the obstacle can be planned in advance. The geometry of the appliance is taken into account in the planning and is known accordingly. The obstacle is identified and detected or scanned during the exploration journey or during the cleaning journey by suitable sensors such as for example a lidar sensor, a camera and/or a distance sensor.

In a further advantageous embodiment, a planning of the driving maneuvers is determined by using an outer circle, which envelopes the contour of the obstacle, and an inner circle that lies on the inside of the contour of the obstacle. For the planning of the passes, in a first step, the smallest enclosing outer circle or perimeter, which touches the contour of the obstacle at least at two outer corner points, and an inner circle or incircle that is concentrically disposed in the center of the outer circle and lies against the innermost edge are determined. The number of straight driving maneuvers and the driving plan are then determined in dependence upon the circles that are determined.

In a further advantageous embodiment, the straight driving maneuvers are performed if a radius of the outer circle does not exceed a predefined threshold value. In particular, the driving maneuvers are only performed in the case of small obstacles, since in the case of large obstacles it is possible to clean up to the edge without special driving maneuvers. Whether an obstacle is to be classified as small can be determined by checking the outer circle. If the radius $r_A$ of the outer circle exceeds the threshold value $r_G$, it can thus be assumed that using its protruding cleaning element the appliance can clean to the edge even with a normal drive around the obstacle by edge tracking along the contour. Obstacles whose outer circle radius $r_A$ is smaller than the threshold value $r_G$ cannot be cleaned to the edge by edge tracking maneuvers and the robot vacuum cleaner therefore drives around the obstacles using the straight driving maneuvers in accordance with the invention.

If the difference between the radii of the outer circle and the inner circle ($r_A-r_I$) is compared with the effective operating range of the cleaning element (range $a_R$–minimum or safety distance as), a statement is made as to whether it is possible to pass the obstacle from any direction at the minimum distance and in this case to clean to the edge. The more similar the contour of the obstacle is to a circle, the smaller the difference in the circular radii ($r_A - r_I$) and the easier it is to reach all obstacle edges during cleaning while passing. Viewed geometrically, a line of the minimum distance is applied to the outer circle in order to check whether a line parallel thereto intersects the inner circle at a distance corresponding to the operating range of the cleaning element.

In a further advantageous embodiment, an overlapping circle segment is determined based on an intersection of the range of cleaning elements with the inner circle.

The following applies:

($a_R - a_S$) − ($r_A - r_I$) > $h_{min}$: Obstacle can be cleaned to the edge by any passing;

($a_R - a_S$) − ($r_A - r_I$) ≤ $h_{min}$: Obstacle cannot be cleaned to the edge by any passing;

wherein $h_{min}$ defines a minimum height of the overlapping circle segment between the inner circle and the area swept by the cleaning element. The determination of the minimum height of the overlapping circle segment $h_{min}$ prevents too many driving maneuvers from being performed around the obstacle, and is determined from the generally maximum permitted number of driving maneuvers and the current inner circle radius.

In a further advantageous embodiment, a center point angle is determined based on the overlapping segment, wherein the number of driving maneuvers is preferably determined using the center point angle. In particular, the following formula applies to $h_{min}$:

$$h_{min} = r_I * (1 - \cos(\alpha_{min}/2))$$

with minimum center point angle $\alpha_{min}$ of the circle segment:

$$\alpha_{min} = (2*\pi)/N_{max},$$

wherein $N_{max}$ is the maximum permitted number of passes. If it is ensured that there is a sufficient overlapping segment between the operating range of the cleaning element and the inner circle, it is thus possible to calculate how many straight driving maneuvers at the obstacle are necessary to ensure cleaning to the edge. For this purpose, in a first step, the actual height h of the overlapping circle segment of the inner circle and range line and then the resulting center point angle α are calculated:

$$h = (a_R - a_S) - (r_A - r_I);$$

$$\alpha = 2 * \arccos(1 - (h/r_I)).$$

The number N of driving maneuvers can be determined using the center point angle α:

$$N = 360°/\alpha.$$

N is rounded up to the nearest integer (in other words the smallest whole number greater than or equal to). A difference angle $\varphi_{diff}$ between adjacent driving maneuvers in this case is:

$$\varphi_{diff} = 360°/N.$$

This means inter alia that when a center point angle α is greater than or equal to 180°, two driving maneuvers are performed, in particular in parallel oppositely directed paths with $\varphi_{diff} = 180°$, when a center point angle is between 120° and 180° inclusive, three driving maneuvers are performed (with $\varphi_{diff} = 120°$), and/or when the center point angle is between 90° and 120° inclusive, four driving maneuvers are performed (with $\varphi_{diff} = 90°$). The selected starting angle is arbitrary in this case, since the obstacle can be cleaned equally from all directions. Preferably, however, the initial angle is taken into account in the cleaning planning for the surrounding area of the obstacle.

If there is not a sufficient overlapping circle segment between the cleaning element and the inner circle, which means ($a_R - a_S$) − ($r_A - r_I$) ≤ $h_{min}$, it is thus not possible to clean the obstacle to the edge using the existing cleaning element and using straight driving maneuvers. Special movement maneuvers of the appliance are necessary in this case, for example, in order to move into concave shapes of the contour of the obstacle or to position the cleaning element there in a targeted manner.

In a further advantageous embodiment, it is determined whether the contour of the obstacle has a substantially elongated shape. For this purpose, in particular, main axes are determined from the measured values for the obstacle. The first main axis runs along the longest extent. The second main axis is perpendicular thereto. If the extent of the obstacle contour in the direction of the second main axis is approximately equal to the diameter of the inner circle, it is an elongated, narrow obstacle. For such obstacles, it is advantageous to pass along the first main axis on both sides in order to clean the edges along the long side. If the inner radius $r_I$ is greater than the cleaning range of the appliance ($a_R - a_S$), additional driving maneuvers perpendicular to the first main axis at the ends of the contour are advantageous.

With the objects of the invention in view, there is concomitantly provided a mobile self-propelled appliance, which is operated as described above, and includes a computing unit, which is configured so as to calculate the number of straight driving maneuvers based on a size and/or shape of the obstacle.

Any features, configurations, embodiments and advantages relating to the method are also used in connection with the device in accordance with the invention, and vice versa.

Other features which are considered as characteristic for the invention are set forth in the appended claims.

Although the invention is illustrated and described herein as embodied in a method for operating a mobile self-propelled appliance and a mobile self-propelled appliance operated according to the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
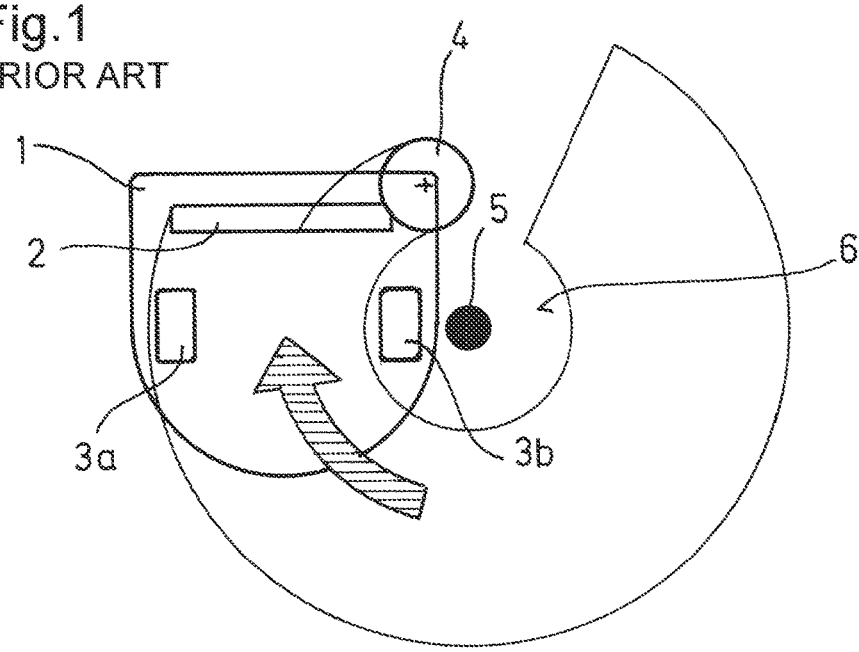
FIG. 1 is a diagrammatic, top-plan view of an exemplary embodiment of a mobile self-propelled appliance according to the prior art during chair leg cleaning.

Referring now to the figures of the drawings in detail and first, particularly, to FIG. 1 thereof, there is seen a mobile, self-propelled appliance, in particular a robot vacuum cleaner 1, which includes a suction mouth 2, drive wheels 3a, 3b and a cleaning element 4, in particular a side brush. The side brush is disposed at a front right-hand side corner of an appliance housing of the robot vacuum cleaner 1, and renders it possible for the robot vacuum cleaner to perform improved edge and corner cleaning.

In order to clean small obstacles 5, such as for example chair or table legs, it is conventionally provided that the robot vacuum cleaner 1 drives around the leg that is to be cleaned with the side brush on the leg. However, due to the size of the suction mouth, the positioning of the side brush, and the shape of the appliance housing, there is the risk that a surrounding area 6 of the obstacle 5 or a circular edge around the obstacle 5. remains uncleaned.

Figure 2B:
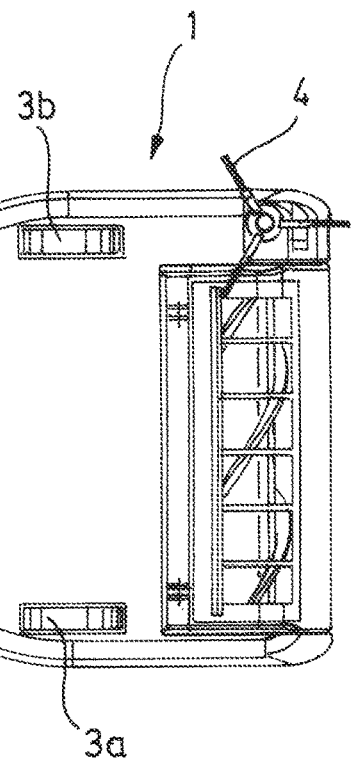
FIG. 2B is a diagrammatic, bottom-plan view of an exemplary embodiment of a mobile self-propelled appliance in accordance with the invention.
Figure 2A:
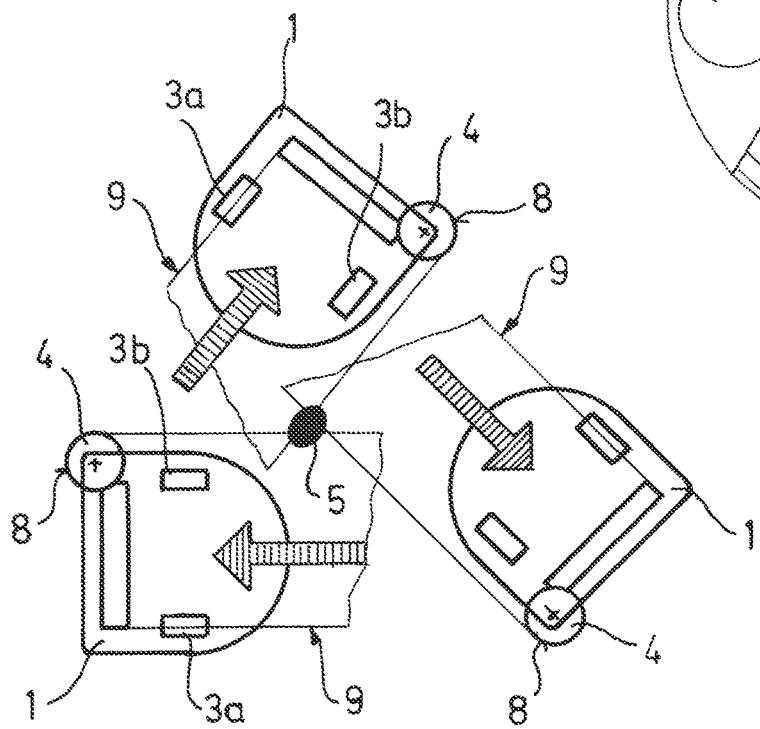
FIG. 2A is a diagrammatic, top-plan view of an exemplary embodiment of a mobile self-propelled appliance in accordance with the invention during chair leg cleaning.

In order to render it possible to clean to the edge around smaller obstacles, in accordance with the invention straight driving maneuvers 9 from different directions are used, as shown, for example, in FIG. 2A. The number of straight passes required for this can be derived inter alia from the size and shape of the obstacle 5. In accordance with the invention, an improved edge cleaning is realized by an optimization of the driving strategy of the robot vacuum cleaner 1.

The robot vacuum cleaner has a cleaning element 4 at one of its front corners, for example a rotating side brush, a fixed bristle strip or a cleaning cloth, which projects beyond the contour of the robot vacuum cleaner, as is illustrated in FIGS. 2A, 2B. The housing shape preferably has a D-shape. Alternatively, the robot vacuum cleaner can have a round shape. Through the use of its drive wheels 3a, 3b, a castor wheel 7 and a control facility, the robot vacuum cleaner is able to travel straight paths in any direction on the floor that is to be cleaned. In order to detect, scan and determine the shape and size of obstacles in the floor processing area, a lidar sensor (not illustrated) is used, which is disposed on a rear area of the appliance housing and projects beyond this appliance housing. The necessary number of straight driving maneuvers 9, in particular passes, can be determined based on the derived shape and size of the detected obstacle 5 and based on an operating range 8 of the cleaning element 4 and a desired minimum distance between the robot vacuum cleaner and the obstacle 5 during the drive past. In particular, the cleaning around the obstacle 5 can be planned in advance.

Figure 3A:
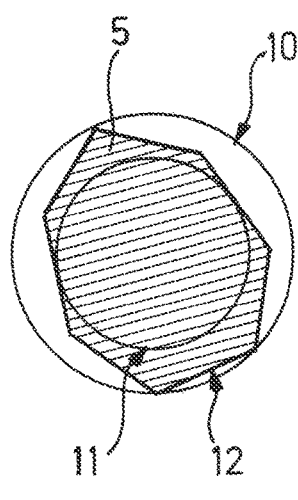
FIGS. 3A-3C are respective diagrammatic, top-plan views of obstacles to define the outer circle and the inner circle.
Figure 3B:
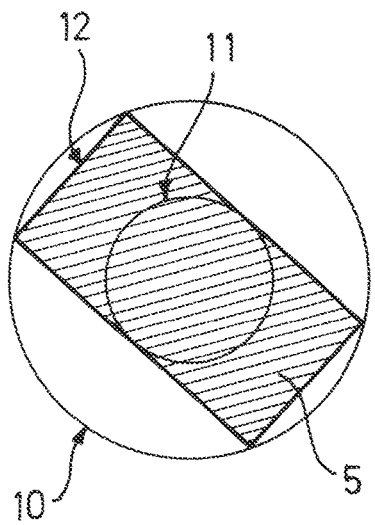
Figure 3C:
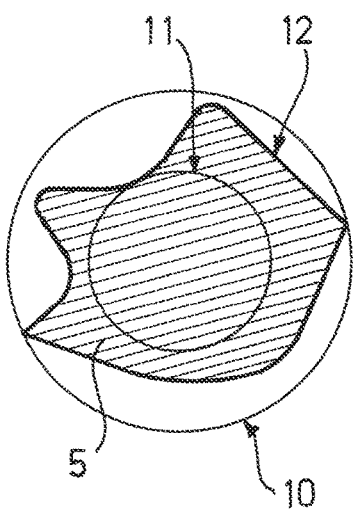

In order to plan the straight driving maneuvers, in a first step, a smallest outer circle 10, which touches the contour of the obstacle 5 at least at two outer corner points, and an inner circle 11, that is concentrically disposed in the center of the outer circle 10 and that lies against the innermost edge, are determined. In FIGS. 3A, 3B, 3C, examples are illustrated of different obstacles 5 having different contours 12. For the different obstacles 5, in particular in each case the outer circle 10, which lies against the outside or envelops the obstacle, and the inner circle 11 that lies against the inside are determined.

The straight driving maneuver in accordance with the invention is used in particular only in the case of obstacles 5 that are classified as small. Whether an obstacle is to be classified as small can be determined via checking the outer circle 10. If the radius $r_A$ of the outer circle 10 exceeds a predefined threshold value $r_G$, the robot vacuum cleaner 1 with its protruding cleaning element 4 cleans to the edge, even in the case of driving normally around the obstacle 5, by using edge tracking along the contour 12. In this case, the straight driving maneuver in accordance with the invention is not necessary. Obstacles which have a radius $r_A$ of the outer circle 10 that falls below the predefined threshold value $r_G$ cannot be cleaned to the edge by edge tracking maneuvers. In this case, the straight driving maneuver in accordance with the invention is used so as to drive around the obstacle 5 in order to clean to the edge.

Figure 4A:
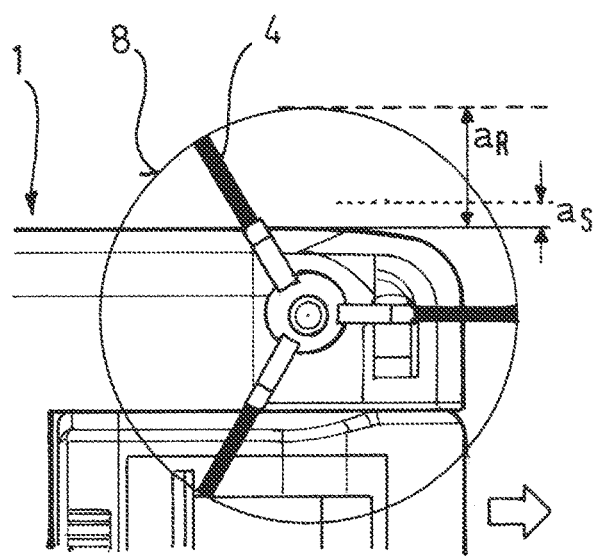
FIGS. 4A-5B are respective diagrammatic, top-plan views for defining the outer circle, the inner circle, the range, the minimum distance, the center point angle, and the height of the overlapping circle segment.
Figure 4B:
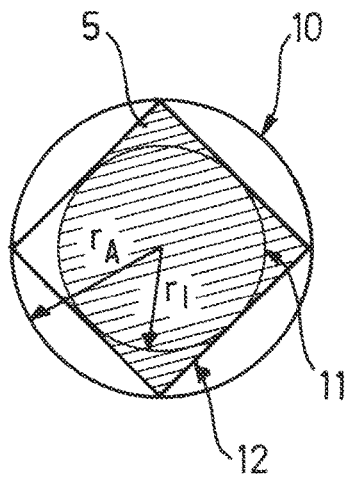

In order to ensure that cleaning to the edge and driving past the obstacle 5 from any direction at the minimum distance are possible, the difference between the outer circle radius $r_A$ and the inner circle radius $r_I$ ($r_A-r_I$) is compared with the effective operating range of the cleaning element (operating range $a_R$-minimum distance $a_S$). The more similar the contour 12 of the obstacle 5 is to a circle, the smaller the difference in the circular radii ($r_A-r_I$) and the easier it is to reach all obstacle edges during cleaning while passing. The operating range of the cleaning element and the minimum distance from the robot vacuum cleaner to the obstacle as well as the circular radii, are illustrated in FIGS. 4A and 4B.

Figure 5A:
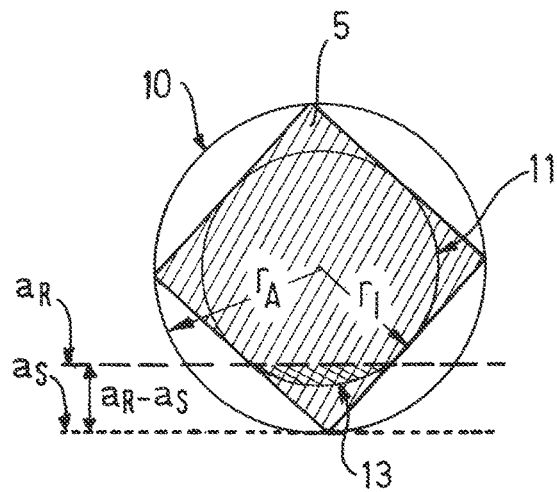
Figure 5B:
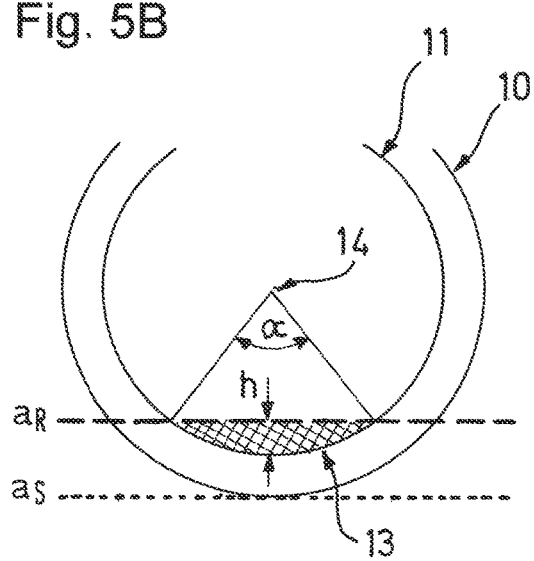

In FIGS. 5A, 5B, the check as to whether an intersection or an overlapping circle segment 13 results between the range $a_R$ and the inner circle 11 is shown geometrically, whereby it is possible to make a statement as to whether the obstacle 5 can be cleaned to the edge by driving past from any direction. The following applies in particular:

- $(a_R-a_S)-(r_A-r_I)>h_{min}$: Obstacle 5 can be cleaned to the edge by any passing;
- $(a_R-a_S)-(r_A-r_I) \leq h_{min}$: Obstacle 5 cannot be cleaned to the edge by any passing;
- wherein $h_{min}$ determines a minimum height of the overlapping circle segment 13 between the inner circle 11 and the area that is swept by the cleaning element. The determination of the minimum height of the overlapping circle segment $h_{min}$ prevents too many driving maneuvers from being performed around the obstacle 5, and is determined from the generally maximum permitted number of driving maneuvers and the current inner circle radius $r_I$.

The overlapping of the range $a_R$ of the cleaning element and the inner circle 11 leads to an overlapping circle segment 13, which is defined by its height h and the center point angle α (see FIG. 5B).

In particular, the following applies for $h_{min}$:

$$h_{min}=r_I*(1-\cos(\alpha_{min}/2))$$

with minimum center point angle $\alpha_{min}$ at the center point 14 of the overlapping circle segment 13:

$$\alpha_{min}=(2*\pi)/N_{max},$$

wherein $N_{max}$ is the maximum permitted number of passes. If it is ensured that there is a sufficient overlapping segment 13 between the operating range $a_R$ of the cleaning element and the inner circle 11, it is thus possible to calculate how many straight driving maneuvers are necessary at the obstacle 5 in order to ensure cleaning to the edge. For this purpose, in a first step, the actual height h of the overlapping circle segment 13 of inner circle 11 and the range line $a_R$ is calculated and subsequently the resulting center point angle α is calculated:

$$h = (a_R - a_S) - (r_A - r_I);$$

$$\alpha = 2 * \arccos(1 - (h/r_I)).$$

The number N of driving maneuvers can be determined by using the center point angle α, in that:

$$N = 360°/\alpha$$

is rounded up to the nearest integer greater than or equal to N. A difference angle $\varphi_{diff}$ between adjacent driving maneuvers in this case is:

$$\varphi_{diff} = 360°/N.$$

If there is not a sufficient overlapping circle segment 13 between the cleaning element and the inner circle 11, which means $(a_R - a_S) - (r_A - r_I) \leq h_{min}$, it is thus not possible to clean the obstacle 5 to the edge using the existing cleaning element and using straight driving maneuvers. Special movement maneuvers of the appliance are necessary in this case, for example, in order to enter into concave formations of the contour of the obstacle 5 or to position the cleaning element there in a targeted manner.

Figure 6:
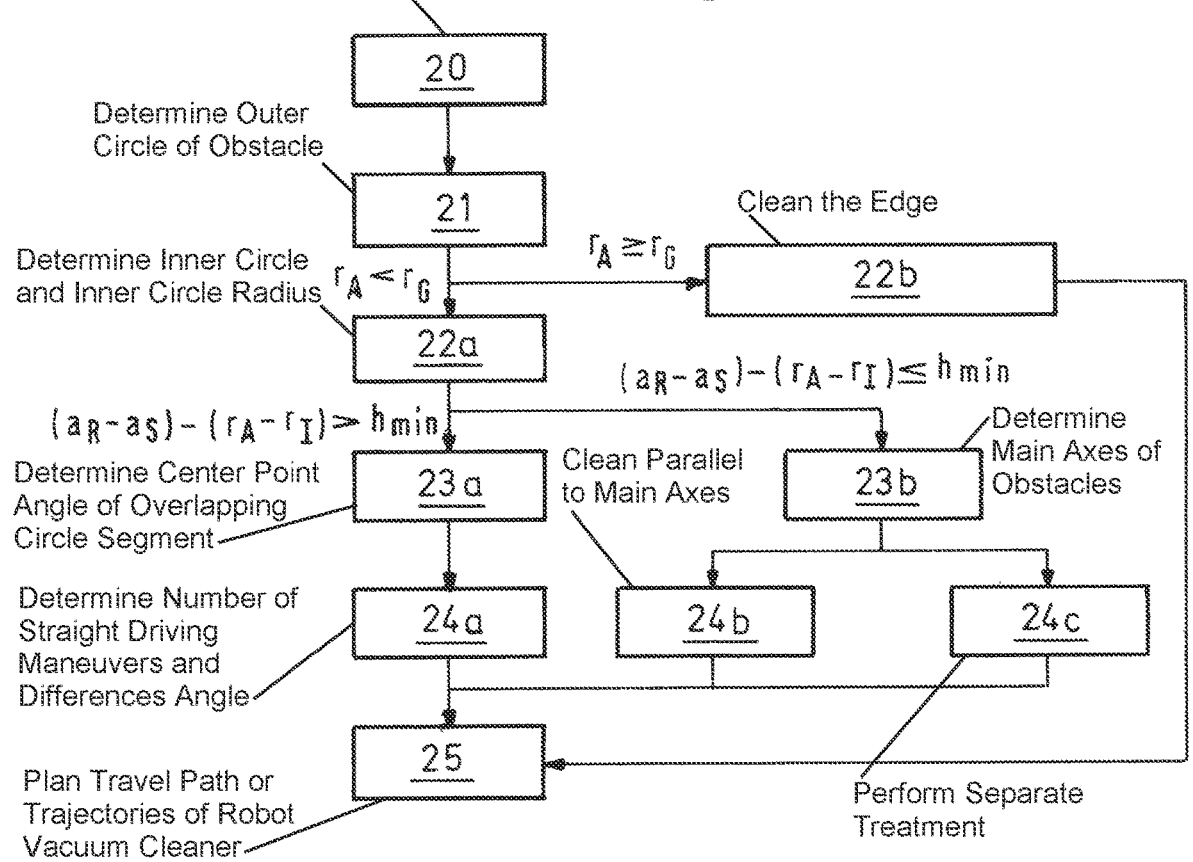
FIG. 6 is a flowchart relating to an exemplary embodiment of an operating method in accordance with the invention.

FIG. 6 illustrates a flowchart of an operating method for cleaning an obstacle to the edge. A simplified method is shown therein (on the left-hand side in the diagram), in which randomly aligned, straight passes are performed. Complex calculations are necessary on the paths shown on the right-hand side, which are oriented in detail to the shape and orientation of the obstacle.

In the first step 20, the obstacle that is to be driven around is scanned or detected in particular from several directions using the lidar sensor of the robot vacuum cleaner. The outer circle of the obstacle can be determined in step 21 using the scanned values.

If the radius of the outer circle $r_A$ falls below a predefined threshold value $r_G$ ($r_A < r_G$) in this case, the inner circle and its inner circle radius $r_I$ are determined (step 22a). If $(a_R - a_S) - (r_A - r_I) > h_{min}$, the center point angle α of the overlapping circle segment is determined (step 23a). The number N of straight driving maneuvers and the difference angle are then determined in step 24a. Finally, the travel path or the travel trajectories of the robot vacuum cleaner can be planned for the cleaning of obstacles in the vicinity (step 25).

If, after step 21, the radius of the outer circle $r_A$ exceeds the predefined threshold value $r_G$ ($r_A \geq r_G$), the cleaning element of the robot vacuum cleaner can clean to the edge during normal edge tracking travel along the contour of the obstacle (step 22b). The travel path or the travel trajectories of the robot vacuum cleaner for cleaning in the vicinity of the obstacle can be planned without further calculation (step 25).

If after step 22a $(a_R - a_S) - (r_A - r_I) \leq h_{min}$, the main axes of the obstacle are determined (step 23b). If the extent along a second main axis corresponds to approximately $r_I$, the cleaning is performed parallel to the main axes (step 24b), and the travel path or the travel trajectories of the robot vacuum cleaner are planned accordingly. If, conversely, the extent along the second main axis is $\gg r_I$, a separate treatment is necessary (step 24c) in order to be able to plan the travel path or the travel trajectories of the robot vacuum cleaner (step 25).

Any steps 20-25 are performed or determined automatically in this case by the device after the obstacle has been detected. Advantageously, user intervention is not necessary. The device independently determines which cleaning of the surrounding area it performs on the basis of the determined or detected values.

The invention claimed is:

1. A method for operating a mobile self-propelled appliance or at least one of a floor cleaning appliance, a robot vacuum cleaner, a robot sweeper or a robot mopping appliance, the method comprising the following steps:
    detecting at least one obstacle in a floor processing area;
    cleaning an area surrounding the obstacle by carrying out at least two straight driving maneuvers at the obstacle from different directions;
    basing a number and direction of the straight driving maneuvers on at least one of a size or a shape of the obstacle;
    further basing the number of straight driving maneuvers on at least one of an operating range of cleaning elements of the appliance or a predetermined minimum distance between the appliance and the obstacle; and
    determining a planning of the driving maneuvers by using an outer circle enveloping a contour of the obstacle and an inner circle lying on an inside of the contour of the obstacle.

2. The method according to claim 1, which further comprises performing the straight driving maneuvers if a radius of the outer circle does not exceed a predefined threshold value.

3. The method according to claim 1, which further comprises determining an overlapping circle segment based on an intersection of the operating range of the cleaning elements with the inner circle.

4. The method according to claim 3, which further comprises determining a center point angle based on the overlapping circle segment.

5. The method according to claim 4, which further comprises determining the number of driving maneuvers by using the center point angle.

6. The method according to claim 4, which further comprises performing at least one of:
    two driving maneuvers when the center point angle is greater than or equal to 180°;
    three driving maneuvers when the center point angle is between 120° and 180° inclusive; or
    four driving maneuvers when the center point angle is between 90° and 120° inclusive.

* * * * *